United States Patent
Riegler et al.

(10) Patent No.: US 12,515,284 B2
(45) Date of Patent: Jan. 6, 2026

(54) METHOD OF MAKING A TURBINE BLADE AND RUNNER INCLUDING SUCH A BLADE

(71) Applicant: Voith Patent GmbH, Heidenheim (DE)

(72) Inventors: Walter Riegler, Dover, PA (US); Seth Smith, York Springs, PA (US)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 18/999,583

(22) Filed: Dec. 23, 2024

(65) Prior Publication Data

US 2025/0121463 A1    Apr. 17, 2025

Related U.S. Application Data

(63) Continuation of application No. PCT/EP2023/061486, filed on May 2, 2023.

(60) Provisional application No. 63/354,793, filed on Jun. 23, 2022.

(51) Int. Cl.
| | |
|---|---|
| *B23P 15/04* | (2006.01) |
| *B23K 31/02* | (2006.01) |
| *F03B 3/12* | (2006.01) |
| *B23K 101/00* | (2006.01) |

(52) U.S. Cl.
CPC ............. *B23P 15/04* (2013.01); *B23K 31/02* (2013.01); *F03B 3/121* (2013.01); *B23K 2101/001* (2018.08)

(58) Field of Classification Search
CPC ... B23P 15/04; B23K 31/02; B23K 2101/001; F03B 3/121; F05B 2230/21; F05B 2230/232; F05B 2240/30; F05B 2240/302
See application file for complete search history.

(56) References Cited

U.S. PATENT DOCUMENTS

| | | |
|---|---|---|
| 2,457,889 A | 1/1949 | Jen |
| 3,797,965 A | 3/1974 | Tonooka et al. |
| 5,896,657 A | 4/1999 | Beyer et al. |

FOREIGN PATENT DOCUMENTS

| | | |
|---|---|---|
| FR | 2 916 667 A1 | 12/2008 |
| WO | 2016/011537 A1 | 1/2016 |
| WO | 2018/137821 A1 | 8/2018 |

OTHER PUBLICATIONS

Notification of Transmittal of the International Search Report and the Written Opinion of the International Searching Authority, or the Declaration dated Jul. 31, 2023 for International Patent Application No. PCT/EP2023/061486 (11 pages).

*Primary Examiner* — Moshe Wilensky
(74) *Attorney, Agent, or Firm* — TAYLOR & EDELSTEIN, PC

(57) ABSTRACT

A method of making a blade of a hydroelectric turbine installation includes: providing the blade includes a first part and a second part; machining the first part and the second part so as to form a profile of a first surface and a second surface of the blade; composing the blade by welding the first part to the second part, the welding forming a first weld seam located on the first surface and a second weld seam located on the second surface; and machining the first weld seam and the second weld seam, the first part and the second part being provided by casting, the first part including a first area of the first surface, a first area and a second area of the second surface, and the second part including a second area and a third area of the first surface and a third area of the second surface.

3 Claims, 6 Drawing Sheets

METHOD OF MAKING A TURBINE BLADE AND RUNNER INCLUDING SUCH A BLADE

CROSS REFERENCE TO RELATED APPLICATIONS

This is a continuation of PCT application no. PCT/EP2023/061486, entitled "METHOD OF MAKING A TURBINE BLADE AND RUNNER COMPRISING SUCH A BLADE", filed May 2, 2023, which is incorporated herein by reference. PCT application no. PCT/EP2023/061486 claims priority to U.S. provisional patent application No. 63/354,793, filed Jun. 23, 2022, which is incorporated herein by reference.

BACKGROUND OF THE INVENTION

1. Field of the Invention

The present invention relates to hydroelectric turbine installations.

2. Description of the Related Art

The present invention relates generally to hydroelectric turbine installations with at least one blade containing a hollow passage. Blades with a hollow passage are used in hydroelectric installations with ways for enhancing the level of dissolved gas in water passing through the turbine. In this case the hollow passage is passed by gas. Blades with a hollow passage are also used for reducing axial thrust in radial flow turbines of the Francis type (compare e.g., WO 2018/137821 A1). In this case the hollow passage is passed by water. The present invention relates also to a runner including a blade.

Methods of making a turbine blade with a hollow passage for a hydroelectric turbine installation are known from prior art. For example, U.S. Pat. No. 5,896,657 A discloses a method of making a such a turbine blade. Initially, a blank is cut from mill plate to the overall blade profile. Then the blank is cut into a leading blade portion or member 48 and a trailing blade portion or insert 50 (see FIG. 5). Insert 50 optionally includes a region of inner edge 36 of blade 32. However, an alternative embodiment is illustrated in FIGS. 9 and 10 in which an insert 50' is spaced from an inner edge 36', and a shallow groove 52 and an overlying cover plate 54 extend from inner edge 36' to a rear edge 56' of a member 48'. Cover plate 54 is welded within an upper area of shallow groove 52 and is generally flush with a suction side 42' of the blade. A rearwardly opening slot or groove 58 is machined along a length of a rear or trailing edge 56 of member 48, leaving an upper shoulder 60 and a lower shoulder 62. Lower shoulder 62 is machined to include a beveled surface 64 extending from pressure side 40 (i.e., the lower surface as illustrated in FIGS. 3 and 4) to a rearwardly projecting lip 66. A frontwardly opening slot or groove 68 is machined along a front or leading edge 70 of insert 50, leaving an upper shoulder 72 and a lower shoulder 74. Upper shoulder 72 is machined to include a beveled surface 76 extending from suction side 42 (i.e., the upper surface as illustrated in FIGS. 3 and 4) to a frontwardly projecting lip 78. A plurality of discharge passages 80 are formed in insert 50 (e.g., by drilling) extending from groove 68 to trailing edge 46. Finally, member 48 and insert 50 are connected by welding. As shown in FIGS. 3 and 4, rearwardly opening groove 58 and frontwardly opening groove 68 thus cooperate to form an integral aeration conduit or passage 47 through which an oxygen containing gas, such as air, can be transported.

What is needed in the art is a method of making a turbine blade with a hollow passage, which is simpler and less costly compared to the method known from prior art.

SUMMARY OF THE INVENTION

The present invention provides a method of making a blade of a hydroelectric turbine installation includes the steps of: providing that the blade includes a first edge, a second edge, a third edge, a fourth edge, a first surface, a second surface, a first aperture, a second aperture, and a passage extending between the first aperture and the second aperture, the first aperture being located at the first edge, the second aperture being located at the second edge, the first surface and the second surface each including three disjoint areas which are defined by projecting an outline of the passage to a corresponding one of the first surface or the second surface, the three disjoint areas of the first surface being a first area, a second area, and a third area, the three disjoint areas of the second surface being a first area, a second area, and a third area, for the first surface the first area of the first surface and the third area of the first surface being located beside the passage and the second area of the first surface being located above the passage, for the second surface the first area of the second surface and the third area of the second surface being located beside the passage and the second area of the second surface being located above the passage, the blade further including a first part and a second part; machining the first part and the second part so as to form a profile of the first surface and the second surface of the blade; composing the blade by welding the first part to the second part, wherein the welding forms a first weld seam located on the first surface and a second weld seam located on the second surface; and machining the first weld seam and the second weld seam, the first part and the second part being provided by casting, the first part including the first area of the first surface, the first area of the second surface, and the second area of the second surface, and the second part including the second area of the first surface, the third area of the first surface, and the third area of the second surface. Optionally, the welding is performed using a narrow gap welding method. Optionally, the blade is a part of a runner of the hydroelectric turbine installation, wherein the runner includes a hub, and the welding of the first part to the second part is done after the first part and the second part are connected to the hub of the runner.

The present invention also provides a runner of a hydroelectric turbine installation includes: at least one blade, which is made by a method including the steps of: providing that the blade includes a first edge, a second edge, a third edge, a fourth edge, a first surface, a second surface, a first aperture, a second aperture, and a passage extending between the first aperture and the second aperture, the first aperture being located at the first edge, the second aperture being located at the second edge, the first surface and the second surface each including three disjoint areas which are defined by projecting an outline of the passage to a corresponding one of the first surface or the second surface, the three disjoint areas of the first surface being a first area, a second area, and a third area, the three disjoint areas of the second surface being a first area, a second area, and a third area, for the first surface the first area of the first surface and the third area of the first surface being located beside the passage and the second area of the first surface being located above the passage, for the second surface the first area of the second surface and the third area of the second surface being located beside the passage and the second area of the second surface being located above the passage, the blade further including a first part and a second part; machining the first part and the second part so as to form a profile of the first surface and the second surface of the blade; composing the blade by welding the first part to the second part, wherein the welding forms a first weld seam located on the first surface and a second weld seam located on the second surface; and machining the first weld seam and the second weld seam, the first part and the second part being provided by casting, the first part including the first area of the first surface, the first area of the second surface, and the second area of the second surface, and the second part including the second area of the first surface, the third area of the first surface, and the third area of the second surface.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
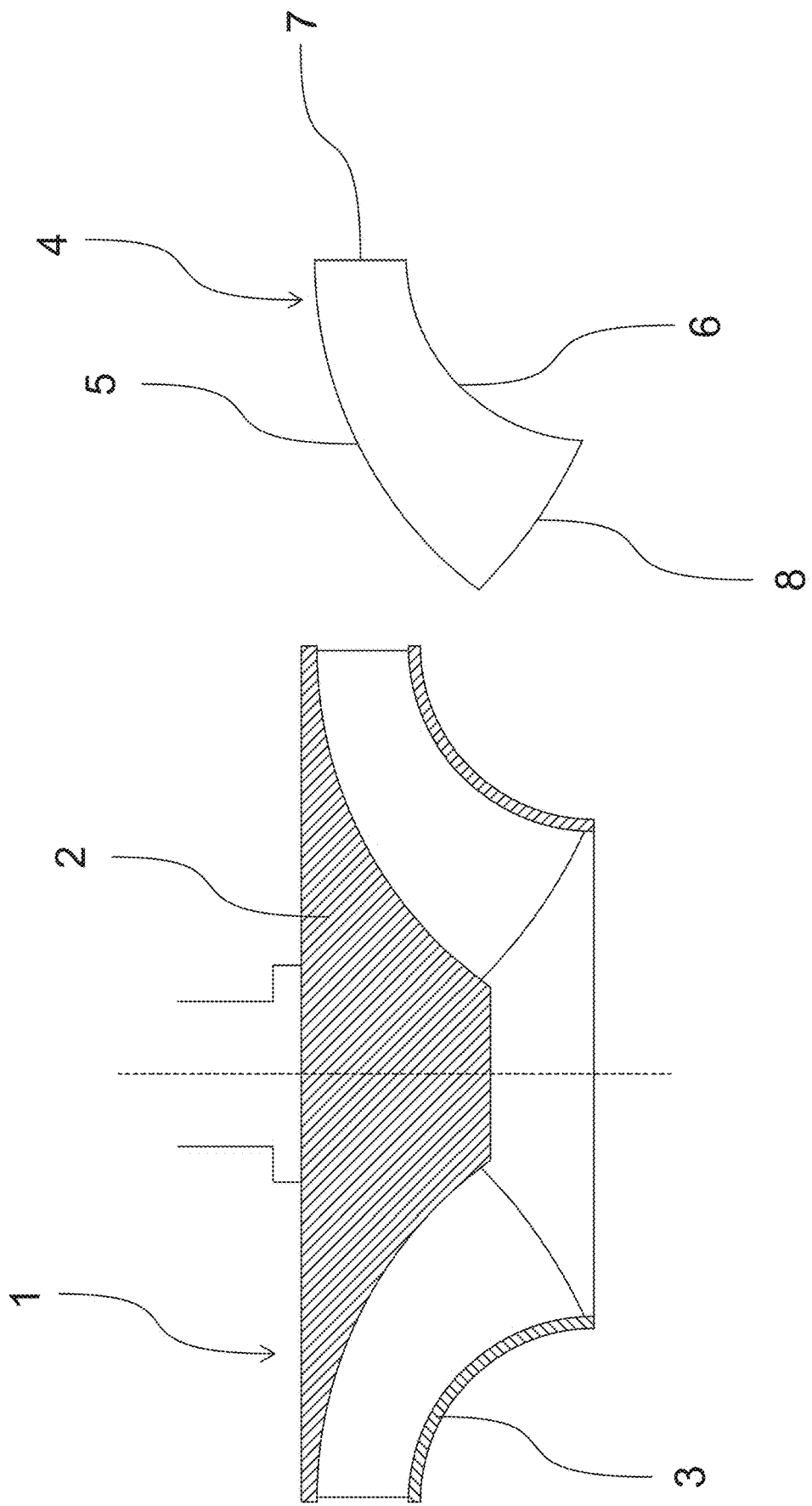
FIG. 1 is a Francis type runner and blade.

FIG. 1 shows on the left side a Francis type runner in schematic rendering. The runner is designated by 1 and includes a hub designated by 2 and a band designated by 3. The hub 1 is also called crown. There are also Francis type runners without a band. Such runners are called 'shroudless' (compare e.g., WO 2016/011537 A1). The runner 1 includes a multitude of blades. Such a blade is shown separately on the right side of FIG. 1 and is designated by 4. The blade includes four edges: A first edge, which is called inner edge and is designated by 5, a second edge, which is called outer edge and is designated by 6, a third edge, which is called leading edge and is designated by 7 and a fourth edge, which is called trailing edge and is designated by 8. The inner edge 5 is connected to the hub 2, and the outer edge 6 is connected to the band 3, in case there is a band 3.

Figure 2:
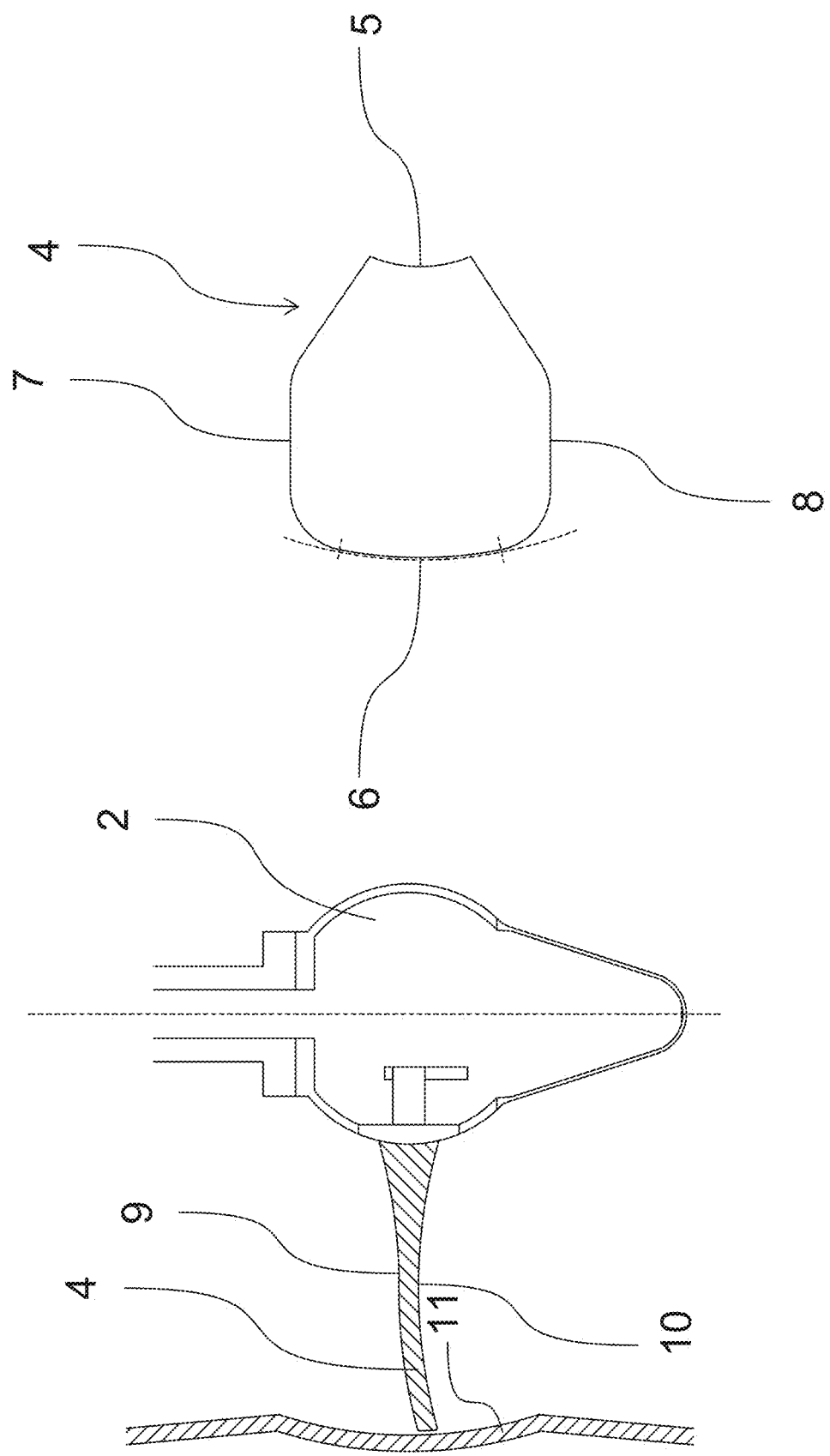
FIG. 2 is a Kaplan type runner and blade.

FIG. 2 shows the same elements as FIG. 1 but for a Kaplan type runner. A Kaplan type runner included a multitude of pivotable blades 4. Kaplan type runners include no such thing as a band and the outer edges 6 of the blades are shaped in a way to form a narrow gap between the runner ring and the blade 4. The runner ring is designated as 11. Since the gap should be homogenous for each pivot position of the blade 4 the inner surface of the runner ring 11 and the outer edges 6 of the blade 4 are shaped spherical. Since Kaplan type blades are sometimes rounded in the region between the outer edge 6 and the adjacent edges it is not immediately clear where the outer edge 6 ends. This can be clarified using the mentioned gap: The outer edge ends at the points, where the blade starts to deviate from forming the homogenous gap. This is indicated by the dashed lines on the right part of FIG. 2.

Another type of turbine including blades according to the present invention is called Propeller type turbine. As the Kaplan type turbine, the Propeller type turbines is an axial flow turbine. The main difference between Kaplan and Propeller type turbine is that the blades of the latter cannot be pivoted. Therefore, the inner surface of the runner ring and the outer edges 6 can be shaped simpler, that means cylindric.

Independent of the turbine type, each blade includes a first and a second surface. In FIG. 2 the first surface is designated by 9 and the second surface is designated by 10. In FIG. 2 and the following the first surface is the pressure side surface and the second surface is the suction side surface. For the method according to the present invention, it makes no difference whether the first surface is the pressures side surface or the suction side surface, and the same holds consequently for the second surface. Therefore, in the claims the phrases 'pressure side surface' and 'suction side surface' won't be used. One of them is the first surface and the other consequently is the second surface.

Blades of the mentioned turbine types can include a passage. A passage is a hollow channel inside the blade. Such a passage can be used in all three turbine types for enhancing the level of dissolved gas in water passing through the turbine. In case of a Francis type turbine such a passage can also be used for reducing the axial thrust.

Blades including a passage manufactured by the method according to the present invention are described with the help of FIGS. 3 to 6. This is carried out exemplarily for the case of a blade of a Francis turbine.

Figure 3:
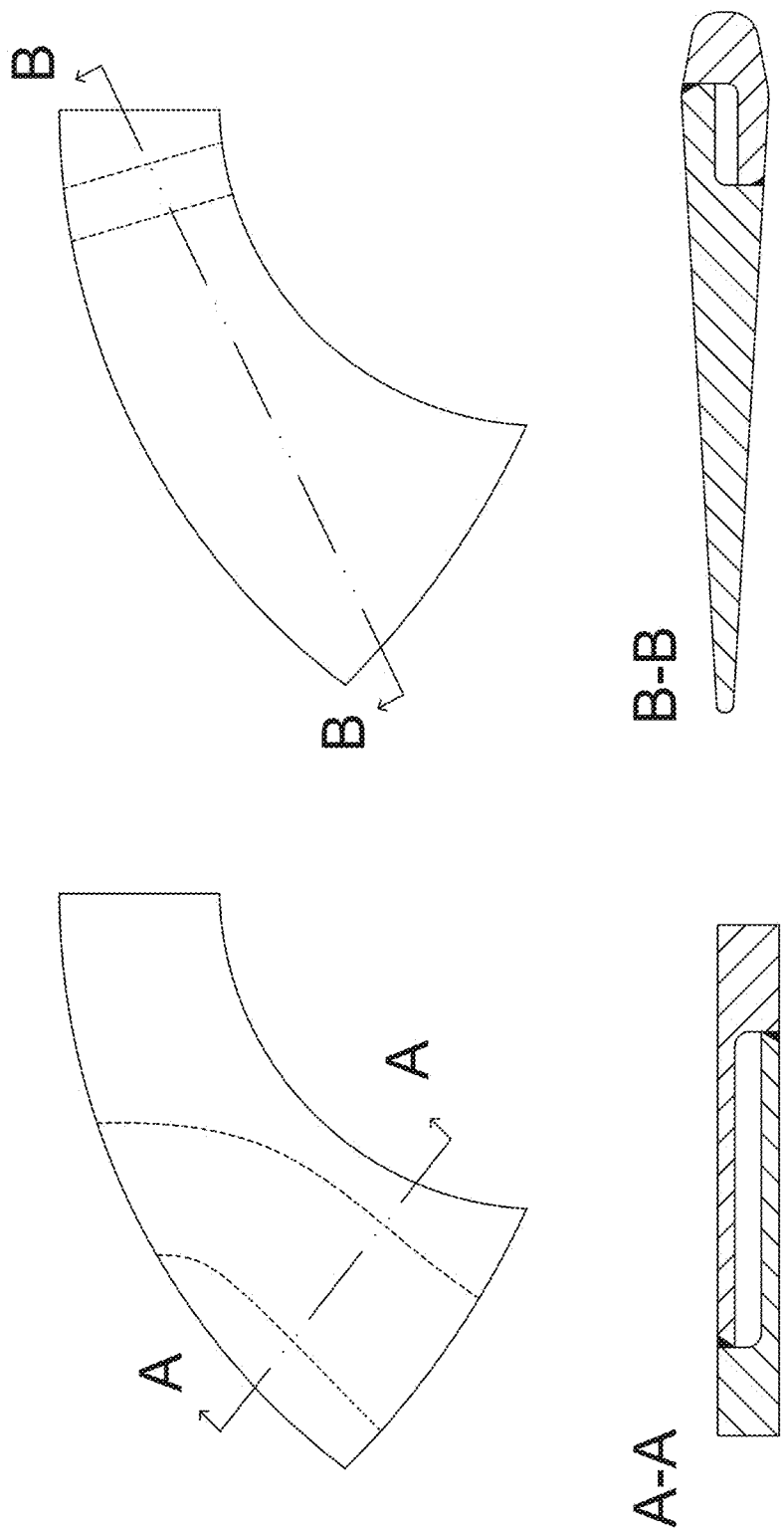
FIG. 3 is a blade according to the present invention including a passage.

Generally, passages in blades extend between two apertures, wherein the two apertures are located at different edges of the blade. FIG. 3 shows on the left and right side two different embodiments of passages respectively. In the embodiment shown on the left side of FIG. 3 a first aperture is located at the inner edge and a second aperture is located at the trailing edge of the blade. In the embodiment shown on the right side of FIG. 3 a first aperture is located at the inner edge and a second aperture is located at the outer edge of the blade. At the lower part of FIG. 3 the cross sections along the lines A-A and B-B are shown. In both cases the blade consists of two parts which are welded together by two welding seams, wherein one welding seam is located on one surface of the blade and the other welding seam is located on the other surface of the blade. The welding seams are indicated by the solid triangles.

Figure 4:
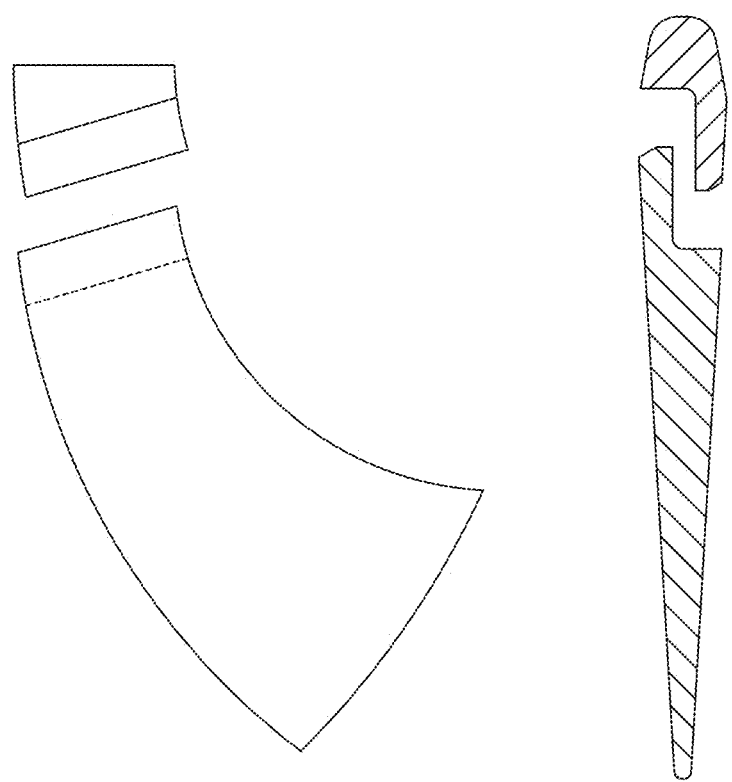
FIG. 4 are parts of a blade according to the present invention.
Figure 4:
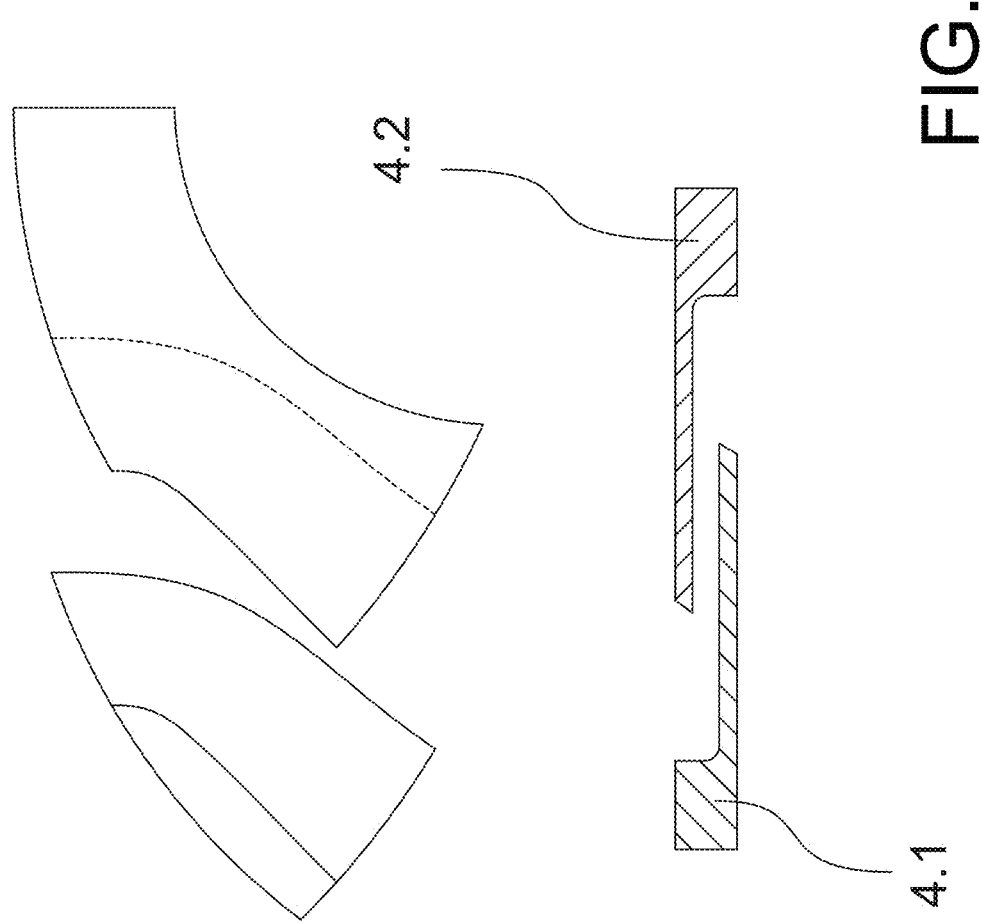

FIG. 4 shows the same embodiments as FIG. 3, wherein in FIG. 4 the two parts of the blade are shown separately, that means before they are welded together. In the lower left part of FIG. 4 a first part of the blade is designated by 4.1 and a second part of the blade is designated by 4.2.

Figure 5:
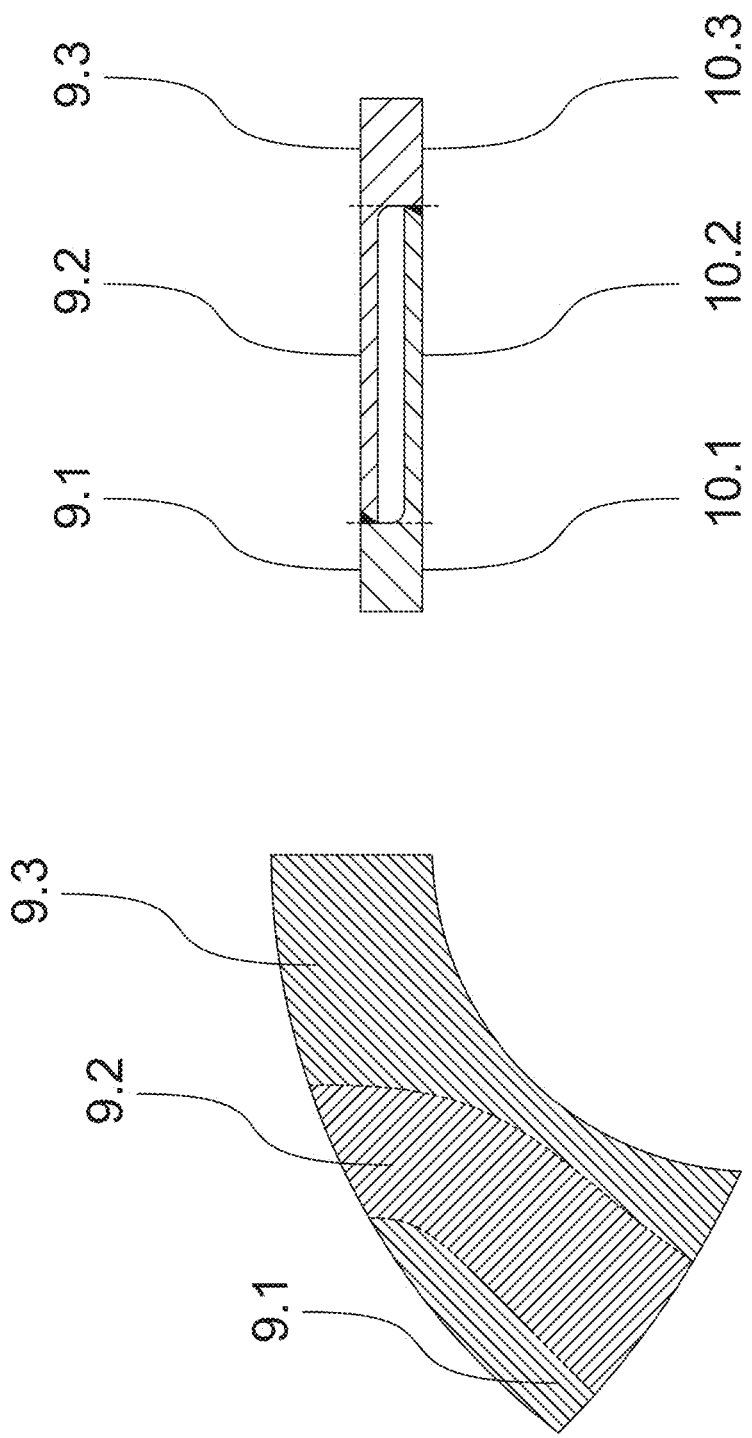
FIG. 5 is a pressure side surface of a blade according to the present invention.

FIG. 5 focuses on the pressure side surface of the blade according to the left-side embodiment of FIGS. 3 and 4. The pressure side surface consists of three disjoint areas. A first area is designated by 9.1, a second area is designated by 9.2, and a third area is designated by 9.3. The three areas are defined by projecting the outline of the passage on the pressure side surface. The right side of FIG. 5 shows the corresponding cross section according to FIG. 3. The second area 9.2 is located above the passage and the other areas 9.1 and 9.3 are located beside the passage. Similar areas exist on the suction side surface, which will be described in the next paragraph.

Figure 6:
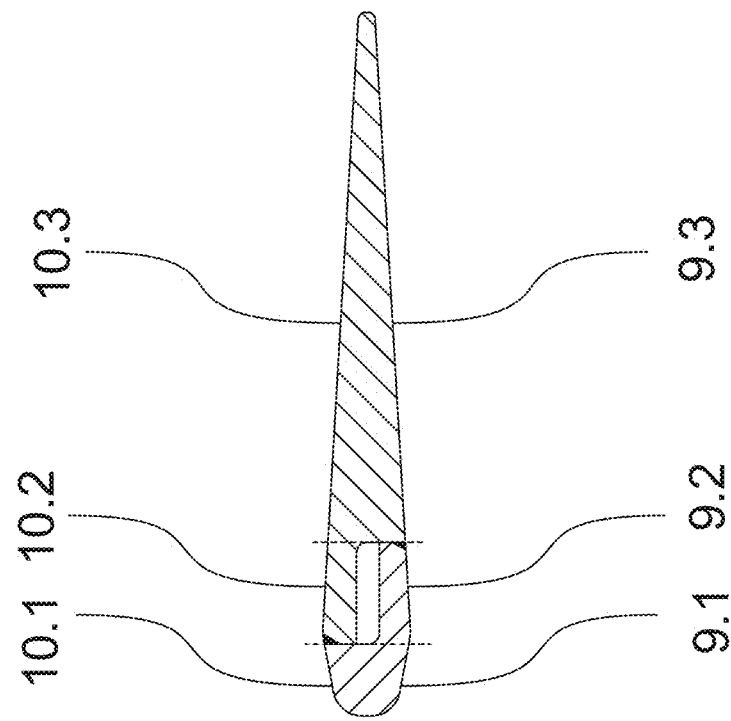
FIG. 6 is a suction side surface of a blade according to the present invention.
Figure 6:
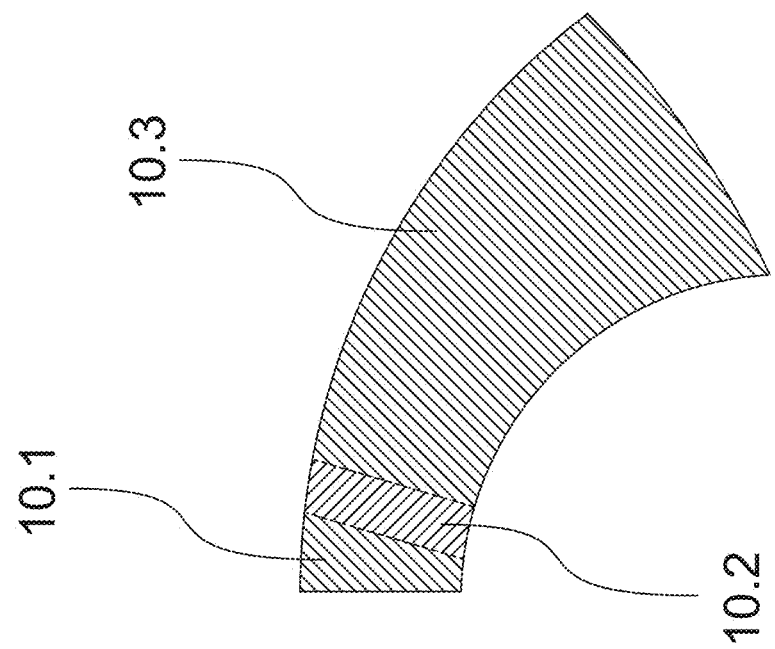

FIG. 6 focuses on the suction side surface of the blade according to the right-side embodiment of FIGS. 3 and 4. The suction side surface consists of three disjoint areas. A first area is designated by 10.1, a second area is designated by 10.2, and a third area is designated by 10.3. The three areas are defined by projecting the outline of the passage on the suction side surface. The right side of FIG. 6 shows the corresponding cross section according to FIG. 3. The second area 10.2 is located above the passage, and the other areas 10.1 and 10.3 are located beside the passage.

It is clear from FIGS. 5 and 6, that corresponding areas on the two surfaces are named and numbered in the same way. That means that the first area 9.1 of the pressure side surface is located opposite to the first area 10.1 of the suction side surface, and so on.

For the directions of the mentioned projections, there exist several possibilities. The projection can for example be perpendicular to the corresponding surfaces or perpendicular to the centerline of the blade profile. In FIGS. 5 and 6 the projection lines are indicated by the dashed lines. However, deviations from the perpendicular directions up to 30° make almost no difference. This is due to the fact that the blades are rather slim.

The definitions based on FIGS. 3 to 6 can be used to formulate the method of the present invention and to generally define the two parts 4.1 and 4.2 composing the blade. The first part 4.1 includes the first area 9.1 of the pressure side surface and the first area 10.1 and the second area 10.2 of the suction side surface, whereas the second part 4.2 includes the second area 9.2 and the third area 9.3 of the pressure side surface and the third area 10.3 of the suction side surface.

The method of making a turbine blade with a passage according to the present invention includes the following steps:
  Providing a first part 4.1 and a second part 4.2;
  Machining the first part 4.1 and the second part 4.2 in order to form the profile of the first and the second surface of the blade 4;
  Composing the blade 4 by welding the first part 4.1 to the second part 4.2, wherein the welding includes a first weld seam located on the first surface and a second weld seam located on the second surface of the blade 4;
  Machining of the weld seams.

The steps can be performed in the above stated order. It is also possible that the step 'machining the first part 4.1 and the second part 4.2 . . . ' is performed after the step 'composing the blade 4 by welding . . . '.

The first part 4.1 and the second part 4.2 are provided by casting. The machining of the parts 4.1 and 4.2 is done in the regions which form a part of the first and second surface of the blade 4. Those are the areas 9.1, 9.2, 9.3, 10.1, 10.2 and 10.3. The parts 4.1 and 4.2 can include bevels to accommodate the weld seams. If the welding is done using a narrow gap welding method, no bevels are needed. The machining of the weld seams is performed to get smooth first and second surfaces.

In a variation of the described method the first part 4.1 and the second part 4.2 are first connected to the runner hub 2 and afterwards welded together.

The method according to the present invention is less complex than the methods known from prior art, since the two parts composing the blade can be provided by casting. In the case that one of the apertures of the passage is located at the rather thin trailing edge of the blade, the welding seams are running almost perpendicular to the trailing edge near this edge, which causes less deformation of the outlet blade angles due to the welding compared to welds running parallel to the trailing edge as are needed according to the method known from prior art.

| TABLE of reference signs | |
|---|---|
| 1 | Runner |
| 2 | Hub/Crown |
| 3 | Band |
| 4 | Blade |
| 4.1 | First part of a blade |
| 4.2 | Second part of a blade |
| 5 | Inner edge |
| 6 | Outer edge |
| 7 | Leading edge |
| 8 | Trailing edge |
| 9 | Pressure side surface |
| 9.1 | First area of the pressure side surface |
| 9.2 | Second area of the pressure side surface |
| 9.3 | Third area of the pressure side surface |
| 10.1 | First area of the suction side surface |
| 10.2 | Second area of the suction side surface |
| 10.3 | Third area of the suction side surface |
| 10 | Suction side surface |
| 11 | Runner ring |

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of making a blade of a hydroelectric turbine installation, the method comprising the steps of:
  providing that the blade includes a first edge, a second edge, a third edge, a fourth edge, a first surface, a second surface, a first aperture, a second aperture, and a passage extending between the first aperture and the second aperture, the first aperture being located at the first edge, the second aperture being located at the second edge, the first surface and the second surface each including three disjoint areas which are defined by projecting an outline of the passage to a corresponding one of the first surface or the second surface, the three disjoint areas of the first surface being a first area, a second area, and a third area, the three disjoint areas of the second surface being a first area, a second area, and a third area, for the first surface the first area of the first surface and the third area of the first surface being located beside the passage and the second area of the first surface being located vertically relative to the passage, for the second surface the first area of the second surface and the third area of the second surface being located beside the passage and the second area of the second surface being located vertically relative to the passage, the blade further including a first part and a second part;
  machining the first part and the second part so as to form a profile of the first surface and the second surface of the blade;

composing the blade by welding the first part to the second part, wherein the welding forms a first weld seam located on the first surface and a second weld seam located on the second surface; and machining the first weld seam and the second weld seam, the first part and the second part being provided by casting, the first part including the first area of the first surface, the first area of the second surface, and the second area of the second surface, and the second part including the second area of the first surface, the third area of the first surface, and the third area of the second surface.

2. The method of claim 1, wherein the welding is performed using a narrow gap welding method.

3. The method of claim 1, wherein the blade is a part of a runner of the hydroelectric turbine installation, wherein the runner includes a hub, and the welding of the first part to the second part is done after the first part and the second part are connected to the hub of the runner.

* * * * *